United States Patent
Ichimaru

(10) Patent No.: US 7,001,164 B2
(45) Date of Patent: Feb. 21, 2006

(54) LOCKING AND UNLOCKING MECHANISM OF POST-CURING INFLATOR

(75) Inventor: Hironobu Ichimaru, Chikugo (JP)

(73) Assignee: Ichimaru Giken Co., Ltd., Fukuoka (JP)

( * ) Notice: Subject to any disclaimer, the term of this patent is extended or adjusted under 35 U.S.C. 154(b) by 263 days.

(21) Appl. No.: 10/416,685

(22) PCT Filed: Jan. 9, 2001

(86) PCT No.: PCT/JP01/00053

§ 371 (c)(1),
(2), (4) Date: May 9, 2003

(87) PCT Pub. No.: WO02/055279

PCT Pub. Date: Jul. 18, 2002

(65) Prior Publication Data

US 2004/0013756 A1 Jan. 22, 2004

(51) Int. Cl.
*B29C 35/16* (2006.01)

(52) U.S. Cl. .................................................... 425/58.1
(58) Field of Classification Search ................. 425/58.1
See application file for complete search history.

(56) References Cited

U.S. PATENT DOCUMENTS

| 3,184,794 | A | * | 5/1965 | Sherkin | ........................ | 425/36 |
| 4,124,337 | A | * | 11/1978 | Martin | ...................... | 425/58.1 |
| 4,944,951 | A | | 7/1990 | Katayama et al. | | |
| 5,770,236 | A | * | 6/1998 | Ureshino et al. | .......... | 425/58.1 |

FOREIGN PATENT DOCUMENTS

JP 2001-58325 3/2001

* cited by examiner

*Primary Examiner*—James P. Mackey
(74) *Attorney, Agent, or Firm*—Fynn, Thiel, Boutell & Tanis, PC

(57) ABSTRACT

The present invention provides a locking and unlocking mechanism of a post-curing in which a male mold is simplified in structure and reduced in weight, and the entire device including an upper flange hoisting and lowering device is reduced in size and weight.

The locking and unlocking mechanism comprises a pair of flanges 1 and 2 for closing openings formed in left and right side surfaces of the tire, and a lock mechanism A provided between the flanges for supporting an expansion load of the tire. The lock mechanism A comprises a male rod 4 projecting from a surface of one of the flanges, and a female mold 3 of the other flange with which a tip end of the male rod 4 is engaged. An adjust mechanism for setting a length of the male rod 4 is connected to a base portion of the male rod 4. The male rod 4 is provided with a slide portion extended as the tire is expanded. The adjust mechanism sets a distance between the flanges 1 and 2 in accordance with a width of the tire. An expansion load of the tire is supported by the male rod 4 and the female mold 3.

2 Claims, 4 Drawing Sheets

LOCKING AND UNLOCKING MECHANISM OF POST-CURING INFLATOR

FIELD OF ART

The present invention relates to a locking and unlocking mechanism of a post-curing inflator for cooling and molding a tire after the tire is cured.

BACKGROUND OF THE INVENTION

A rubber tire which is to be mounted to a vehicle or the like is cured, so that the tire is hardened into a final shape and is provided with sufficient strength and resiliency, but since a tire after it is cured is hot and soft and thus, the tire is transferred into a postcure inflator and is cooled and hardened therein.

As shown in FIG. 5, this post-curing inflator comprises a pair of flanges for closing openings in left and right side surfaces of the tire, and a hoisting and lowering device for sliding the upper flange, and a tire after it is cured is sandwiched between the flanges and tightly closed and then, compressed gas is allowed to blow into the tire and the tire is cooled for a predetermined time in a state in which the tire is expanded.

If the compressed gas is allowed to blow into the tire, a tire expansion load is applied between the flanges. Therefore, there is provided a locking and unlocking mechanism which connects center portions of the flanges such that the flanges can withstand the load, and releases the connection therebetween when the tire is inserted between the flanges or removed therefrom.

This locking and unlocking mechanism mainly comprises a lower flange 57 onto which a tire is horizontally placed, an upper flange 58 fitted to the lower flange 57, and a male rod 59 and a male mold 60 which can slide with each other in a direction in which the upper and lower flanges approach each other but maintain a constant distance between the male rod 59 and the male mold 60 in a direction in which the flanges are separated from each other.

The male rod 59 projects from the upper flange downward, and a tip end of the male rod 59 and a tip end of the male mold 60 are engaged with each other.

If a tire after it is cured is placed on the lower flange 57, the upper flange 58 is lowered onto the tire, and the openings of the left and right sides are closed.

After the tire is closed, compressed gas is allowed to blow into the tire, an expansion load is supported by the male rod 59 and the male mold 60, and the tire is cooled and hardened.

The openings of the tire are closed for expanding the tire between the upper and lower flanges. That is, in order to bring the flanges 57 and 58 into tight contact with each other, since the openings of the tire are converged inwardly and the tire after it is cured is hot and soft, it is necessary to bring the flanges 57 and 58 close to each other more than a predetermined width which cools and hardens the flanges, and to bring a rim into abutment against a bead portion.

Therefore, in the case of a conventional locking and unlocking mechanism, it is necessary to deeply insert the male rod 59 into the male mold 60 to bring the flanges 57 and 58 close to each other.

Therefore, a deep male mold 60 is required and there is a problem that the entire device becomes long and large in size.

Further, in the conventional locking and unlocking mechanism, since there is a locking and unlocking driving section on the side of the upper flange, there is a problem that the hoisting and lowering device of the upper flange also becomes large in size.

The present invention has been accomplished to solve the conventional problems, and it is an object of the invention to provide a locking and unlocking mechanism of a post-curing inflator in which a male rod is disposed on the side of a lower flange and a male mold is disposed on the side of an upper flange, a slide portion is formed on the male rod, and a locking and unlocking mechanism driving section is disposed so that the male mold is simplified in structure and reduced in weight, and the entire device including the upper flange hoisting and lowering device is reduced in size and weight.

DISCLOSURE OF THE INVENTION

As means for achieving the above object, a first aspect of the present invention provides a locking and unlocking mechanism of a post-curing inflator in which compressed gas is allowed to blow into a tire after it is cured, and the tire is cooled and molded in a state in which the tire is expanded, the locking mechanism comprises a pair of flanges for closing openings formed in left and right side surfaces of the tire, and a locking mechanism provided between the flanges for supporting an expansion load of the tire, wherein the flanges comprise a lower flange on which the tire is horizontally placed, and an upper flange disposed above the lower flange such that the upper flange can be hoisted and lowered, the locking mechanism comprises a male rod projecting a surface of the lower flange, and a female mold of the upper flange with which a tip end of the male rod is engaged, an adjust mechanism for setting a length of the male rod is connected to a base portion of the male rod, the male rod is provided with a slide portion extended as the tire is expanded, the slide portion is slidably lowered by its own weight at the time of unlocking motion, a distance between the flanges is set in accordance with a width of the tire by the adjust mechanism, an expansion load of the tire is supported by the male rod and the female mold.

According to claim 2, in the locking and unlocking mechanism of a post-curing of claim 1, a tip end of the male rod and the female mold are connected to each other by a bayonet mechanism, a driving section of the bayonet mechanism is disposed on the side of the male rod.

BEST MODE OF EMBODIMENT OF THE INVENTION

An embodiment of the present invention will be explained below based on the figures.

Figure 1:
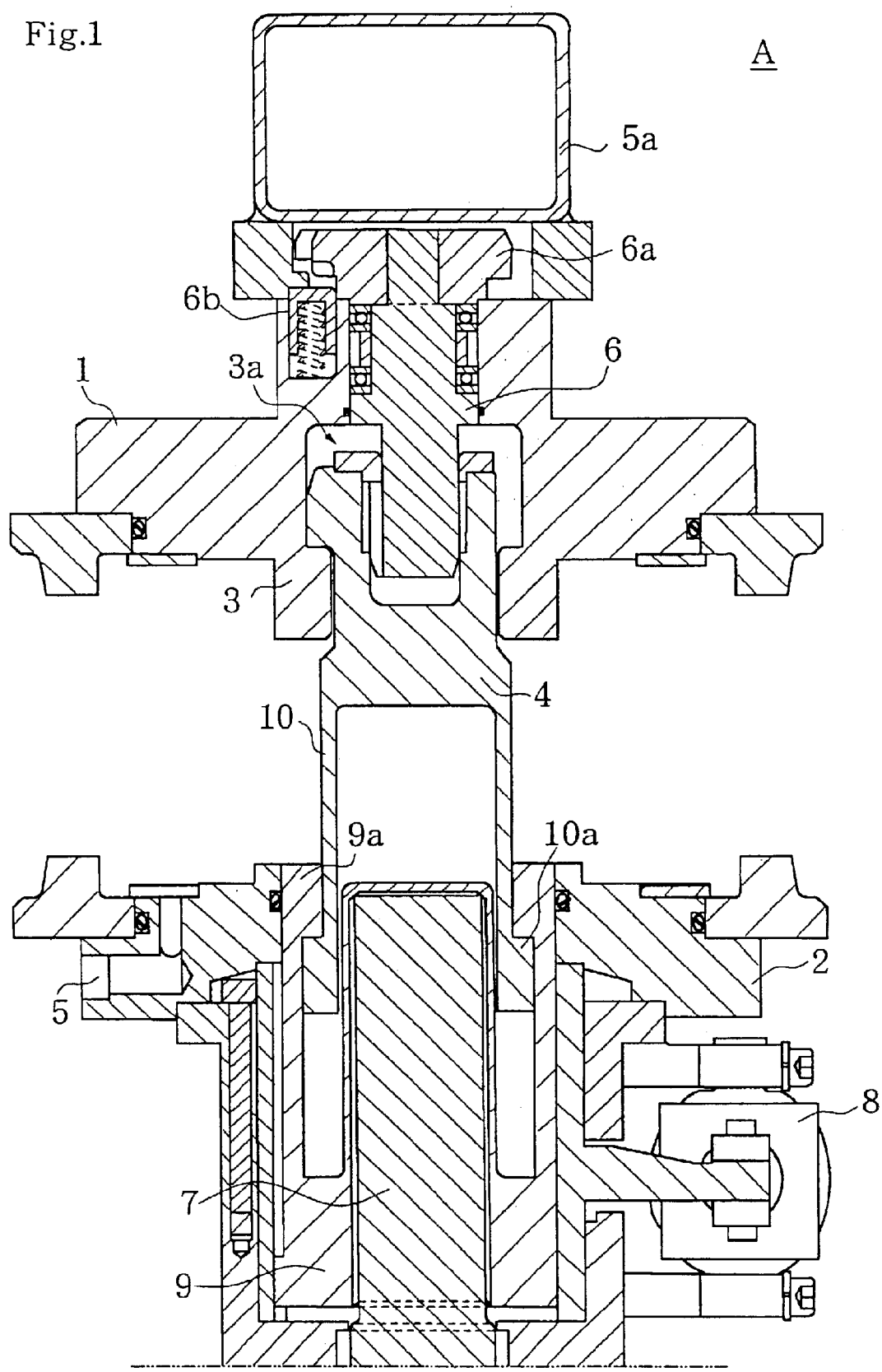
FIG. 1 is a sectional view of a locking and unlocking mechanism of a post-curing inflator.

FIG. 1 is a sectional view of a locking and unlocking mechanism of a post-curing inflator according to one embodiment of the invention.

As shown in FIG. 1, a locking and unlocking mechanism A of a post-curing inflator according to the embodiment of the invention comprises an upper flange 1 and a lower flange 2 which are fitted into openings of left and right side surfaces of tire, and a hoisting and lowering device which vertically moves the upper flange 1, a male mold 3 is formed in a central portion of the upper flange 1, and a male rod 4 projects from a central portion of the lower flange 2.

A rim tightly contacted with an inner periphery of the tire is disposed around outer peripheries of the flanges 1 and 2, and a compressed gas charging hole 5 is formed in one end of the lower flange.

The male mold 3 is formed by a recessed portion 3a formed in a center of a surface of the upper flange 1. A projection 6 for centering the upper and lower flanges and for transmitting a locking and unlocking force. A tip end of the male rod 4 is fitted around an outer periphery of the projection 6.

Figure 3:
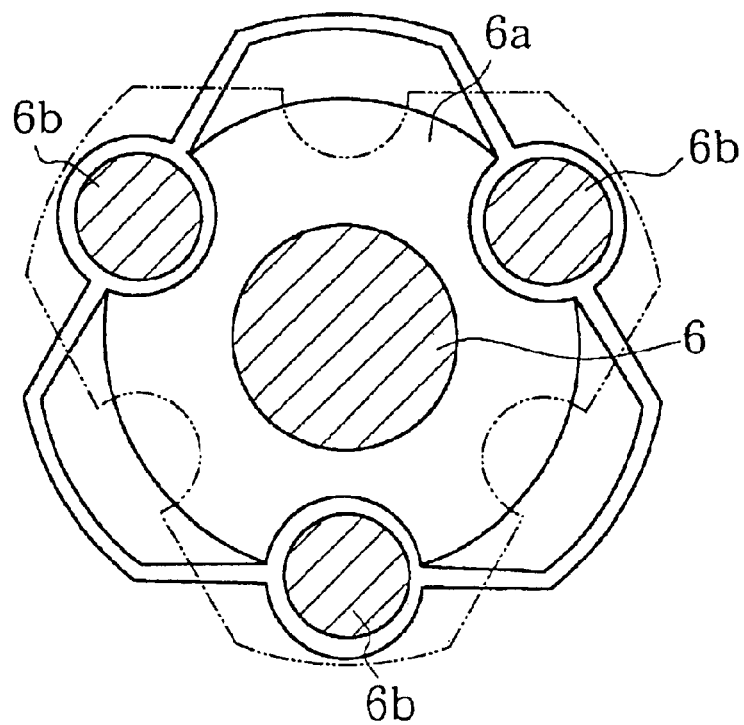
FIG. 3 is a sectional view taken along a line A—A in FIG. 2.

An engagement portion between an upper portion of the projection 6 and a hoisting and lowering device 5a has a bayonet structure as shown in FIG. 3 like an engagement portion between the male rod and a female mold, and is operated simultaneously with a locking and unlocking operation of the bayonet of the engagement portion between the male rod and the female mold. However, these elements are formed into such a reversed operation structure that when the former engagement portion is locked, the latter engagement portion is unlocked, and when the former engagement portion is unlocked, the latter engagement portion is locked.

As a safeguard when the tire is inflated or the flange 1 is vertically moved and the tire is transferred in or out, it is necessary to mechanically hold the locking and unlocking state. As a method thereof, the invention provides a structure in which in the locking and unlocking state, a lock pin 6b is fitted into holes formed in a locking plate 6a through every 120° to restrict the rotation motion of the locking plate, and at the time of locking and unlocking operation, the hoisting and lowering device 5a is lowered to push down the lock pin 6b so that the locking plate 6a can be rotated by motion of a driving section 8.

In FIG. 3, a chain double-dashed line indicates the locking state (state in which the flange 1 and the hoisting and lowering device 5a becomes integral with each other and they can move vertically), and solid lines indicate the unlocking state (state in which the flange 1 and the hoisting and lowering device 5a can be separated).

Figure 2:
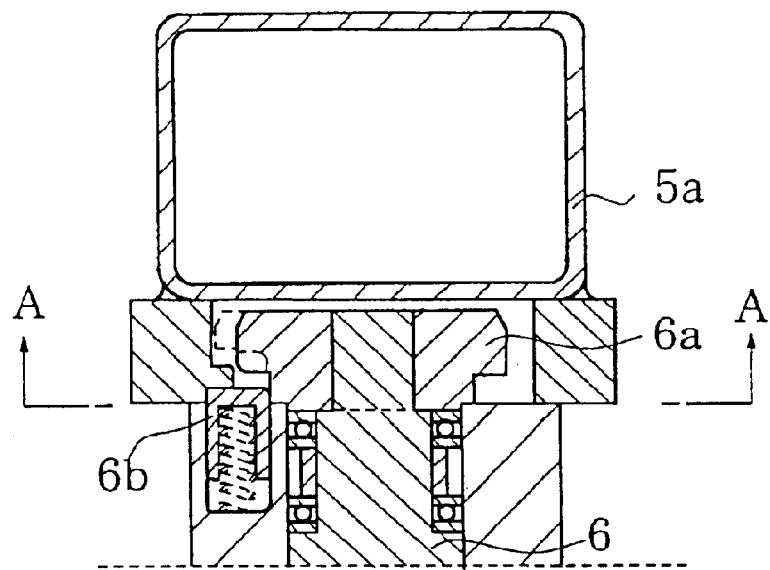
FIG. 2 is an enlarged view of a connection portion between a hoisting and lowering device and an upper flange.

FIG. 2 shows a state in which the hoisting and lowering device 5a pushes down the lock pin.

The upper flange 1 only comprises an engagement portion between the recessed portion of the male mold 3 and the hoisting and lowering device. Therefore, the upper flange 1 is light weighted and small in size, and is suitable for vertical motion and other movement.

In the lower flange 2, a center screw shaft 7, the male rod 4 connected to the screw shaft 7, and a driving section 8 for a bayonet locking and unlocking mechanism are disposed.

The driving section 8 is connected to a base portion of the screw shaft 7, thereby constituting an adjust mechanism.

The male rod 4 comprises an adjust-side rod 9 threadedly engaged with the screw shaft 7, and a slide rod 10 connected to a tip end of the adjust-side rod 9. The slide rod 10 is disposed along an inner side of the adjust-side rod 9, and the slide rod 10 can slide along an inner periphery of the adjust-side rod 9.

The slide rod 10 and the adjust-side rod 9 are slidably connected to each other in a state in which they are fixed by means of a key or the like so that the slide rod 10 and the adjust-side rod 9 are not rotated.

A sliding resistance of this slide portion is small, and at the time of unlocking when a tire is not mounted, the slide rod 10 is lowered by its own weight, and the entire male rod 4 is shortened.

A tip end of the adjust-side rod 9 and a base end of the slide rod 10 are respectively provided with stoppers 9a and 10a. After the slide rod 10 is extended and stoppers are abutted against each other, further extension of the slide rod 10 is prevented to support the expansion load of the tire.

A base end of the adjust-side rod 9 is formed with a male thread, and the male thread is threadedly engaged around an outer periphery of the screw shaft 7 to constitute an adjust mechanism. If the screw shaft 7 is rotated, since the adjust-side rod 9 is prevented from rotating by means of the key or the like, the adjust-side rod 9 is vertically moved. With this, a distance between the flanges 1 and 2 can arbitrarily be set.

Next, a connection structure of the bayonet mechanism will be explained.

Figure 4:
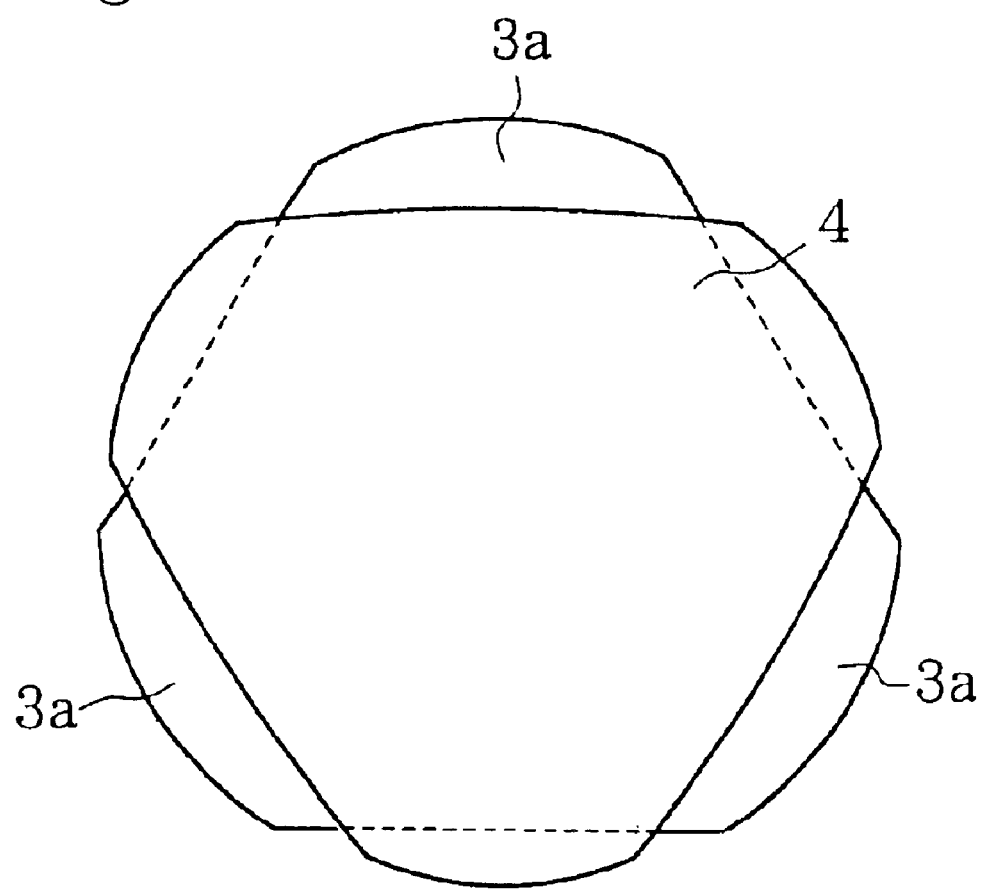
FIG. 4 is an explanatory view showing a bayonet mechanism.
Figure 5:
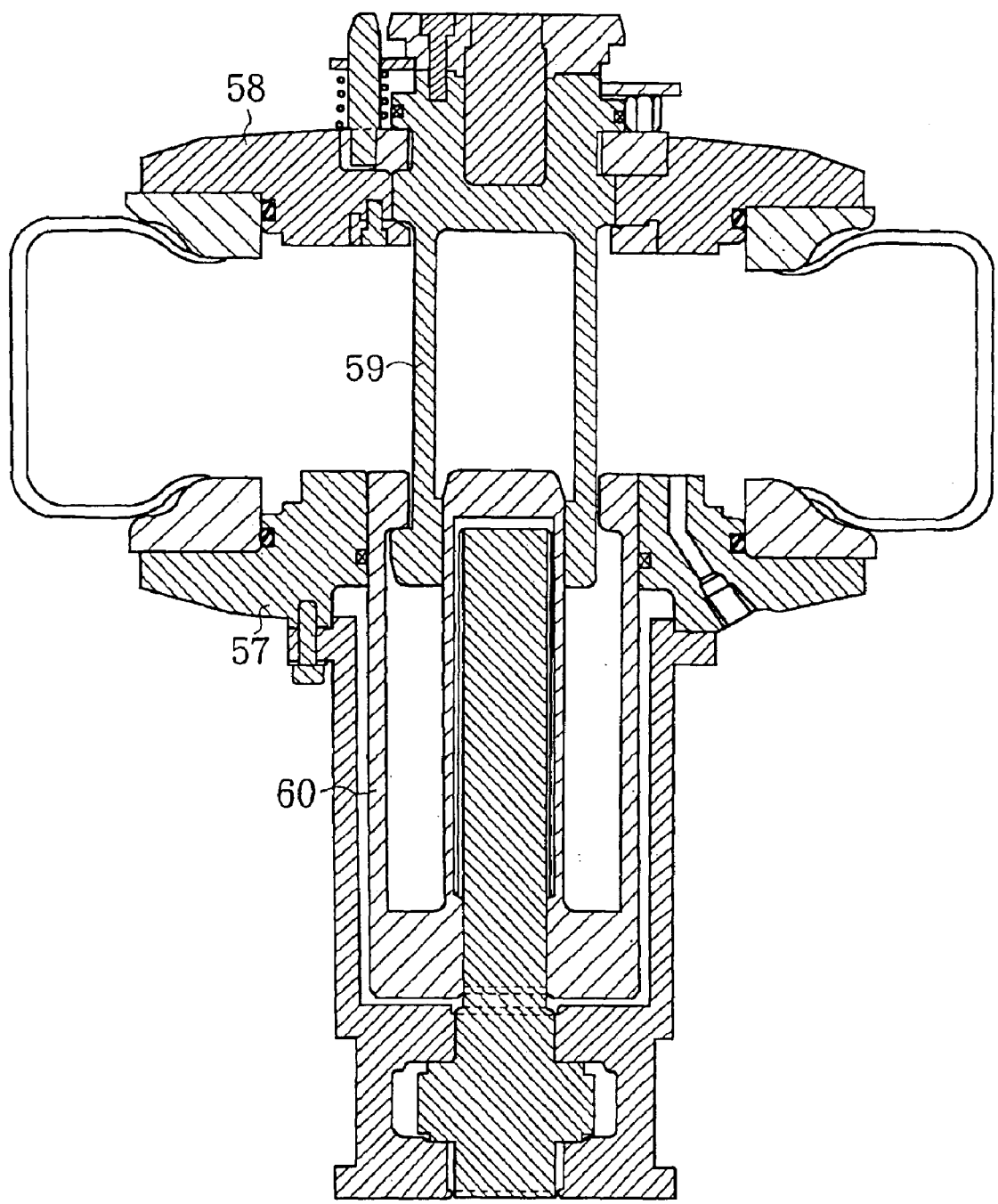
FIG. 5 is a sectional view of a conventional locking and unlocking mechanism.

As shown in FIG. 4, a flat surface of a tip end of the male rod 4 is formed into substantially a triangle shape, and an inlet portion of the female mold is also formed into substantially a triangle shape.

The flat surface of the tip end of the male rod 4 can also be formed into a cross shape or the like other than substantially the triangle shape. In this case, if the male rod 4 is rotated through 45°, the locking and unlocking can be carried out.

The driving section 8 for rotating the male rod 4 is disposed on the side of the lower flange 2. If the male rod 4 is rotated through 60° by the driving section 8, a shape of the tip end of the male rod and a shape of the inlet of the female mold coincide with each other so that the male rod can be fitted into the female mold.

After the male rod 4 is fitted into the female mold 3, the rod is rotated through 60° and is returned to its original position. With this a projection on the tip end of the male rod 4 is engaged with a projection of the inlet of the male mold 3 are engaged and coupled with each other.

In the locking and unlocking mechanism A of the present invention, since the bayonet lock type driving section (cylinder) 8 is disposed on the side of the lower flange 2, unnecessary structure is not added to the upper flange 1 side (female mold), and the female mold is light weighted and small in size.

Next, the operation of the locking and unlocking mechanism of the postcure of the present invention will be explained.

In a state in which no tire is mounted, the upper flange 1 is on standby at an upper position by the hoisting and lowering device, and the lower flange and the upper flange are separated away from each other.

The screw shaft 7 is rotated in accordance with a shape of the tire, a position of the male rod 4 is adjusted, positions of the stoppers 9a and 10a are adjusted, and a distance between flanges 1 and 2 when the tire is expanded by the compressed air is set.

The post-cured tire after it is cured is transferred onto the upper flange 2 by an unloader.

The male rod 4 projects from the center of the lower flange 2, but since the male rod 4 is shortened by its own weight and a projecting amount of the male rod 4 from the rim is small, a hoisting and lowering stroke for placing the tire on the rim of the lower flange 2 by the unloader becomes small, and it is possible to reduce the hoisting and lowering action of the upper flange 1.

After the tire is mounted on the lower flange 2, the hoisting and lowering device is operated, the upper flange 1 is lowered, and the openings in opposite sides of the tire are closed by the flanges.

Since the openings of the tire have shapes converged inwardly, in order to bring the flanges 1 and 2 and the tire into tight contact with each other, it is necessary to bring the flanges 1 and 2 close to each other and to insert the rim into the tire.

According to the conventional locking and unlocking mechanism, since the male rod is not shortened, a deep female mold is required, and it is necessary to insert the male rod deeply into the female mold. In the case of the locking and unlocking mechanism of the present invention, however, since the male mold is shortened, a deep female mold is not required, and the device is shortened.

The tip end of the male rod 4 is engaged with the female mold 3, and they are connected to each other by the bayonet lock mechanism, and connection with a lifter is released. Then, compressed gas is allowed to blow into the tire, and the tire is expanded and cooled.

As the tire is expanded, the slide rod 10 is extended, the stoppers are abutted against each other at a predetermined position, thereby supporting the expansion load of the tire.

After the tire is cooled, the tire is deflated to release the bayonet lock mechanism, and connection with the lifter side is established at the same time, the upper flange 1 is hoisted, and the tire is removed.

Although the embodiment of the present invention has been explained, the concrete structure of the invention should not be limited to the embodiment, and even if the design is modified within a range not departing from the subject matter of the invention, such modification is included in the invention.

For example, although the male rod and the female mold are engaged with each other in the embodiment, an engagement portion other than the female mold can also be used.

Further, although the female mold is disposed on the side of the upper flange in the embodiment, even if the female mold is disposed on the side of the lower flange, this is included in this invention.

INDUSTRIAL AVAILABILITY

As explained above, according to the locking and unlocking mechanism of the post-curing inflator described in claim 1 of this invention, since the adjust mechanism is connected to the male rod side, unnecessary structure is not added to the female mold, and the structure of the female mold is simplified.

Further, since the male rod is formed with the slide portion extended as a tire is inflated, a deep female mold is not required and the device can be made small in size unlike the conventional technique.

Furthermore, since the female mold having the simple structure is disposed on the side of the upper flange which moves vertically instead of on the side of the lower flange whose position is fixed, the motion of the hoisting and lowering device can be reduced. Further, there is no driving section for locking and unlocking and adjusting procedure and thus, there is no wire for a power cable, and a structure of the device is simplified.

Since the mechanism of the upper flange is simple, it is possible to mount a grasping mechanism of a tire to the upper flange to transfer a tire.

Since the male rod is slidably lowered by its own weight at the time of unlocking, an opening motion of the upper and lower flanges when a tire is mounted can be reduced and as a can be reduced.

In the locking and unlocking mechanism of the post-curing device described in claim 3, the male rod and the female mold can be reliably connected to each other by the bayonet lock mechanism.

Further, since the driving section of the bayonet mechanism is disposed on the side of the male rod, unnecessary mechanism is not added to the female mold, and the female mold becomes light in weight and compact in size.

What is claimed is:

1. A locking and unlocking mechanism of a post-curing inflator in which compressed gas is allowed to blow into a tire after it is cured, and the tire is cooled and molded in a state in which the tire is expanded, said locking and unlocking mechanism comprising:

a pair of flanges for closing openings formed in left and right side surfaces of the tire, and a lock mechanism provided between said flanges for supporting an expansion load of the tire, wherein
   the flanges comprise a lower flange on which the tire is horizontally placed, and an upper flange disposed above the lower flange such that the upper flange can be hoisted and lowered, said lock mechanism comprises a male rod projecting from a surface of said lower flange, and a female mold of said upper flange with which a tip end of said male rod is engaged, an adjust mechanism for setting a length of said male rod is connected to a base portion of said male rod, said male rod is provided with a slide portion extended as the tire is expanded, the slide portion is slidably lowered by its own weight at the time of unlocking motion, a distance between said flanges is set in accordance with a width of the tire by said adjust mechanism, and an expansion load of said tire is supported by said male rod and said female mold.

2. A locking and unlocking mechanism of a post-curing inflator according to claim 1, wherein a tip end of the male rod and the female mold are connected to each other by a bayonet mechanism disposed on the side of the male rod.

* * * * *